C. S. LOCKWOOD.
ROLLER BEARING FOR RADIAL AND THRUST LOADS.
APPLICATION FILED OCT. 6, 1911.
1,049,501.  Patented Jan. 7, 1913.
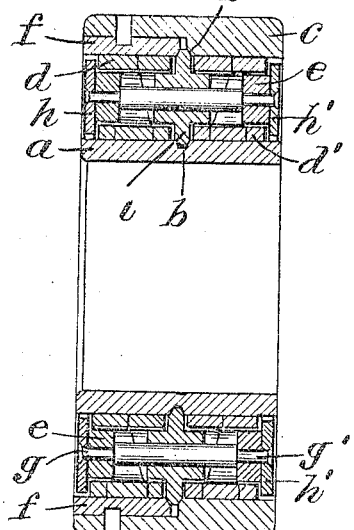
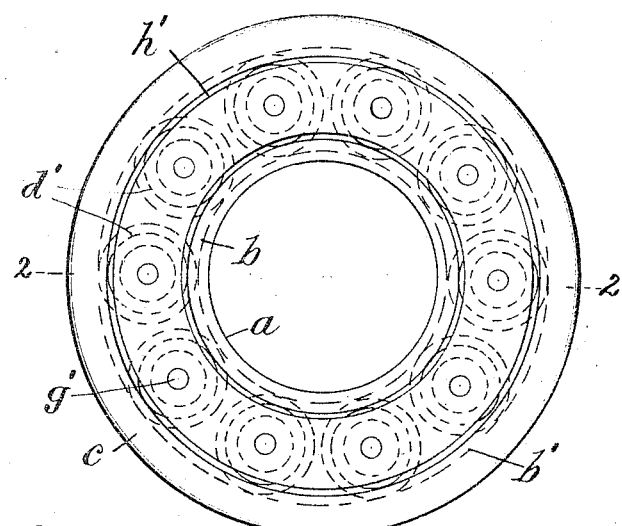
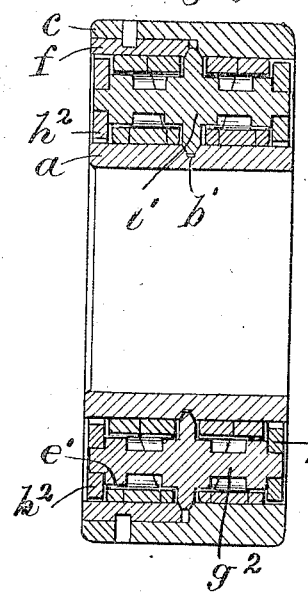
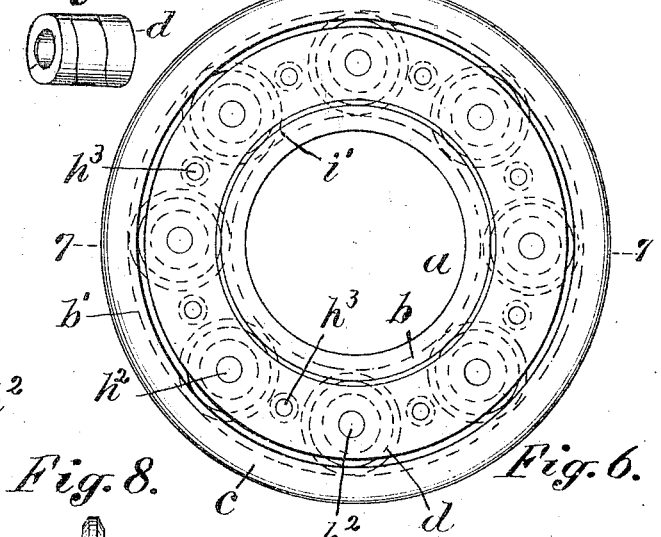

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING FOR RADIAL AND THRUST LOADS.

1,049,501.  Specification of Letters Patent.  Patented Jan. 7, 1913.

Application filed October 6, 1911. Serial No. 653,273.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings for Radial and Thrust Loads, fully described and represented in the following specification and the accompanying drawings, forming a part of the same.

The present invention relates to roller bearings having a hub and casing with opposed grooves at the middle of their length, and rolls fitted to the hub and casing at opposite sides of such groove and a disk fitted to the grooves and rotating therein independently of the rolls. To hold the disks from tipping when the bearing is subjected to end thrust and to support the rolls and disks, concentric with one another, cage-heads are provided in opposite ends of the casing, spindles are extended from the cage-heads through the rolls, and the spindles are furnished with collars next the cage-heads to support the outer ends of the rolls, and the disk is formed with a hub to support the inner ends of the rolls. As the disks are larger than the rolls, they necessarily rotate at the slower speed, and injurious friction is avoided by supporting them to turn independently of the rolls. By supporting the rolls at opposite ends only upon the spindles, they are enabled to rotate with less friction, while they are guided with entire accuracy.

In roller-bearings, provision has been sometimes made to take the thrust upon the ends of the rolls, but any such construction produces a frictional resistance to the movement of the roll at one end or the other, thus tending to twist it out of alinement. By using means independent of the rolls to resist end thrust, such tendency is wholly avoided.

Two forms of construction are illustrated in the annexed drawing, all showing the casing and hub with opposed coincident grooves, and disks rotatable independently of the rolls and fitted to such grooves; but the disks are shown mounted in the cage in three different modes, each of which has the same effect, in preventing the disks from tipping, when resisting end thrust upon the casing. In the first form, a spindle is extended transversely of the cage through each of the rolls and the disk is arranged to rotate loosely upon the spindle; the spindles serving also as tie-bars for the cage, by securing their ends rigidly in the cage-rings. In the second form, independent tie-bars connect the cage between the several rolls, and the spindles are made integral with the disks and rotate in journals upon the cage. In both these forms, the rolls are divided in the middle and the disks are located in such middle space concentric with the rolls. The rolls are thus divided into two sets, one at each end of the casing.

The invention will be understood by reference to the annexed drawing, which shows one construction in Figures 1 to 5ᵃ inclusive, and a modification in Figs. 6 to 8 inclusive. Fig. 1 is an end view of a bearing embodying the invention; Fig. 2 is a longitudinal section, where hatched, on line 2—2 in Fig. 1; Fig. 3 is a perspective view of a spindle-collar; Fig. 4 is an elevation of a disk to rotate upon the spindle; Fig. 5 is an elevation of the spindle to carry a disk rotatable thereon; Fig. 5ᵃ is a perspective view of one of the rolls; Fig. 6 is an end view of a bearing with a modified construction for the disk and spindle; Fig. 7 is a longitudinal section, where hatched, on line 7—7 in Fig. 6; and Fig. 8 is an elevation of a spindle with the disk attached.

The hub $a$ is formed with an external groove $b$ at the middle of its length.

$c$ designates the casing, and $d$ hollow cylindrical rolls formed each of a spirally wound strand and fitted between the hub and casing. The casing is recessed at one end to receive a sleeve $f$, and the bottom of the recess and the inner end of the collar are shaped to form a groove $b'$ coincident with and opposed to the groove $b$. The sleeve is secured in the casing by a pin. The cage is formed of two rings $h, h'$, shown in Figs. 1 and 2 with spindles $g$ extended transversely between them and riveted thereto; such spindles thus serving as tie-bars. The spindles are provided near their ends with collars $e$ which are fitted to reduced ends $g'$ upon the spindle, as shown in Fig. 5. Intermediate such reduced ends, a disk 1 is fitted to turn loosely upon the spindle, being formed with a hub $j$ to sustain the wear, and prevent the disk from tipping under end thrust. Two sets of the rolls are fitted between the hub and casing in the opposite ends of the casing, each of suitable length to fit loosely between the disk and one ring of the cage, and to turn loosely upon the hub of the disk and upon the collars *e*. The rolls rest at their ends only upon the collars and the hub of the disk, and thus turn with very little friction. The cage thus guides the rolls accurately in their movement around the hub, while the disks engage the grooves *b* and *b'* and rotates independently of the rolls. The engagement of the disks with the grooves obviously resists any tendency of the hub and casing to move longitudinally in relation to one another, and produces such effect without pressing the rolls endwise in any degree, or retarding them in their movement by frictional pressure thereon.

In assembling the parts of Fig. 2, the spindles *g* are riveted at one end in the ring *h*, and the rolls *d* are then fitted over the spindles and collars *e*. The disks are then applied to the groove *d* in the hub and the free ends of the spindles inserted through the same. The rolls *d'* and the collars *e* are then applied to the spindle, and the ring *h'* finally riveted upon their ends. The rolls and disks are thus enabled to turn freely around the spindles, and each performs its own function without interference with the operation of the other, the rolls operating to sustain the radial load and the disks to resist end thrust. The casing without the sleeve *f* is then applied to the rolls *d'* and the sleeve *f* inserted in the recess of the casing and secured therein, thus locking the casing upon the rolls and hub, but leaving all the working parts entirely free to rotate.

It has been common to form rolls with integral collars to resist end thrust, but in the present construction entirely independent agencies are employed to sustain the thrust and the radial load.

In the second form, shown in Figs. 6 to 8 inclusive, the disks *b'* are shown integral with or secured rigidly upon the spindles *g²*, and the ends of the spindles turn loosely in the rings *h²*. Such roller bearings are freely supplied with lubricant, so that the ends of the spindles turn easily. To hold the rings in suitable position to carry the spindles rotatably, the rings are connected by tie-bars *h³* shown in Fig. 6, which tie-bars are riveted in both of the rings after the parts between the rings are assembled. The construction of the hub and casing is the same in this second form, but the collars *e'* and disk may be made integral with the spindle, as shown in Figs. 7 and 8.

I am aware that many constructions employing rolls and collars have been devised to resist lateral and end thrust in a roller bearing, and I do not therefore claim the combination of such elements as new; but only the particular construction which is described and claimed herein.

Having thus set forth the nature of the invention what is claimed herein is:

1. In a roller bearing, the combination, with a casing and hub having coincident grooves at the middle of their length, of two sets of hollow rolls fitted to the casing and hub at opposite sides of the grooves, cage-heads within the opposite ends of the casing, spindles connecting the cage-heads within the two sets of rolls and having collars next the cage-heads to support the outer ends of the rolls, and a disk upon the middle of each spindle engaging the grooves between the two sets of rolls and having a hub to support the inner ends of the rolls.

2. In a roller bearing, the combination, with a casing and hub having coincident grooves at the middle of their length, of a sleeve *f* in the casing forming one side of the casing-groove, two sets of hollow rolls fitted to the casing and hub at opposite sides of the grooves, cage-heads within the opposite ends of the casing, spindles connecting the cage-heads within the two sets of rolls and having loose collars thereon to support the outer ends of the rolls, and a disk rotatable upon the middle of each spindle engaging the grooves between the two sets of rolls and having a hub to support the inner ends of the rolls.

3. A roller bearing cage comprising heads *h, h'*, spindles *g* connecting the heads and loose collars *e* fitted to turn upon the spindles adjacent to the heads for supporting hollow rolls in the cage.

4. A roller bearing cage comprising heads *h, h'*, spindles *g* connecting the heads, loose collars *e* fitted to turn upon the spindles adjacent to the heads, and a disk upon the middle of each spindle adapted to engage grooves in the hub and casing of the bearing to resist end thrust.

In testimony whereof I have hereunto set my hand in the presence of two subscribing witnesses.

CHARLES S. LOCKWOOD.

Witnesses:
 HAROLD S. SLOAN,
 CHAS. A. METZGER.